United States Patent
Zuber et al.

(10) Patent No.: US 8,444,159 B2
(45) Date of Patent: May 21, 2013

(54) STABILIZER, AND METHOD OF PRODUCING A STABILIZER

(75) Inventors: Armin Zuber, Paderborn (DE); Ullrich Hammelmaier, Paderborn (DE); Sebastian Saggel, Paderborn (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 0 days.

(21) Appl. No.: 13/227,631

(22) Filed: Sep. 8, 2011

(65) Prior Publication Data

US 2012/0228846 A1    Sep. 13, 2012

(30) Foreign Application Priority Data

Sep. 9, 2010 (DE) .................. 10 2010 044 798

(51) Int. Cl.
*B60G 21/05* (2006.01)
(52) U.S. Cl.
USPC .................................... 280/124.106
(58) Field of Classification Search
USPC ............ 280/124.106, 124.152; 29/896.91
See application file for complete search history.

(56) References Cited

U.S. PATENT DOCUMENTS

| | | | |
|---|---|---|---|
| 6,474,631 B2 * | 11/2002 | Hadano et al. ............... | 267/276 |
| 6,523,843 B2 | 2/2003 | Wiesemann et al. | |
| 7,357,461 B2 | 4/2008 | Zuber | |
| 7,556,273 B2 | 7/2009 | Streubel et al. | |
| 7,926,821 B2 | 4/2011 | Zuber | |
| 7,980,108 B2 | 7/2011 | Zuber | |
| 2003/0111718 A1 | 6/2003 | Kinsman et al. | |
| 2006/0043692 A1 * | 3/2006 | Cai et al. ................ | 280/124.152 |
| 2006/0273530 A1 | 12/2006 | Zuber | |
| 2007/0194549 A1 | 8/2007 | Germano et al. | |
| 2008/0093817 A1 * | 4/2008 | Russell .................. | 280/124.106 |
| 2010/0040408 A1 | 2/2010 | Zuber et al. | |

FOREIGN PATENT DOCUMENTS

| | | |
|---|---|---|
| DE | 100 18 776 C1 | 7/2001 |
| EP | 0 900 677 A1 | 3/1999 |
| EP | 1 810 854 A1 | 7/2007 |

OTHER PUBLICATIONS

Dr. Thomas Säuberlich: "Leichtbaukonzepte für automobile Anwendungen", in: Benteler Stahl/Rohr, Zentrale Entwicklung, Apr. 2010.

* cited by examiner

*Primary Examiner* — Faye M. Fleming
(74) *Attorney, Agent, or Firm* — Henry M. Feiereisen LLC

(57) ABSTRACT

In a method of producing a stabilizer for installation in a bearing unit of a motor vehicle, each end portion of a strip-shaped metal element is provided with a closing contour. The metal element is shaped to assume an undulating configuration having a wave portion. After being placed in a tool, a stabilizer bar is pressed against a circumference of the wave portion of the undulating metal element and the wave portion is formed onto the stabilizer bar such that the wave portion has at least one section which is ironed and the ironed section is urged into forced contact with the stabilizer bar. The metal element is then bent to embrace the stabilizer bar, and the end portions of the metal element are connected by engaging the closing contours of the end portions with a defined incline to thereby form a closed limiter ring fixed to the stabilizer bar.

8 Claims, 3 Drawing Sheets

STABILIZER, AND METHOD OF PRODUCING A STABILIZER

CROSS-REFERENCES TO RELATED APPLICATIONS

This application claims the priority of German Patent Application, Serial No. 10 2010 044 798.6, filed Sep. 9, 2010, pursuant to 35 U.S.C. 119(a)-(d), the content of which is incorporated herein by reference in its entirety as if fully set forth herein.

BACKGROUND OF THE INVENTION

The present invention relates to a stabilizer, and method of producing a stabilizer.

The following discussion of related art is provided to assist the reader in understanding the advantages of the invention, and is not to be construed as an admission that this related art is prior art to this invention.

A stabilizer is used in a motor vehicle for improving road holding. When used as torsion bar to connect various body components, the stabilizer reduces rolling of the body when cornering. The stabilizer extends parallel to the vehicle axle except for end portions which are angled to form a lever for transmitting jouncing and rebounding from one axle side to the opposite axle side. The individual components interact hereby either directly or via individual guide rods. Depending on the construction of the stabilizer, the thus realized travel behavior can be manipulated through structural design or via the engagement of active components.

To secure the stabilizer for rotation between its end portions, pivot bearings are used which are connected to the load-bearing vehicle structure. The pivot bearings are normally configured as slotted or split rubber or rubber-metal bearings and arranged on the stabilizer where they are embraced by clips and fixed to the vehicle. To prevent the stabilizer from axial movement within the pivot bearing, stops are provided to limit the movement. An example of such a stop includes limiter ring which is arranged on the stabilizer and placed within or next to the respective pivot bearing.

There are many ways to configure these limiter rings. For example, the limiter ring may be configured as closed metal ring which is threaded onto the actual stabilizer bar and secured in place by stamping. Attaching and positioning a closed limiter ring is however difficult especially in sections of the stabilizer that are angled or have changes in cross section. Moreover, the end portions of the stabilizer can be worked on only after their attachment. The necessary attachment of the limiter ring before working on the end portions thus interferes with further operations. Any required peening of the stabilizer in the area of the mounted limiter ring complicates the process. Overall, handling is cumbersome during manufacture, accompanied by a multiple displacement of the limiter ring on the stabilizer bar. Taking further into account that stabilizers may be coated and involve further treatments of its end portions, the attachment of the limiter ring is possible only within or between certain process steps. As a consequence, subsequent process steps become either more difficult to execute or require additional measures that complicate the overall process.

It would therefore be desirable and advantageous to address prior art shortcomings.

SUMMARY OF THE INVENTION

According to one aspect of the present invention, a method of producing a stabilizer for installation in a bearing unit of a motor vehicle includes providing each end portion of a strip-shaped metal element with a closing contour, shaping the metal element to assume an undulating configuration with at least one wave portion, placing the undulating metal element in a tool, pressing a stabilizer bar in the tool against a circumference of the wave portion of the metal element, molding the wave portion onto the stabilizer bar such that the wave portion has at least one section which is ironed and the ironed section is urged into forced contact with the stabilizer bar, bending the metal element to embrace the stabilizer bar, and connecting the end portions of the metal element by engaging the closing contours of the end portions with a defined incline to thereby form a closed limiter ring fixed to the stabilizer bar.

Manufacture of a stabilizer in accordance with the present invention thus involves the use of a strip-shaped metal element. The metal element may have varying contours, including parallel sides as well as marginal zones with rounded areas that point to or away from one another. The metal element may have varying thicknesses, resulting in changes in cross section on one side or both sides within the strip-shaped profile. Depending on the application at hand, recesses, projections and varying surface structures may be provided. Also the cross sectional configuration can be best suited to the respective embodiment by configuring the cross section for example rectangular, curved, or a combination thereof. Advantageously, the metal element may be cut to size from a sheet metal strip.

After producing the metal element, both end portions thereof are prepared, for example, by a shaping process. Advantageously, the end portions are subjected to a material removal process, such as machining or milling, or undergo a pressing process to obtain a closing contour. Basically, the required metal element can be produced also by rolling of a sheet metal element which is then cut to size. Although the closing contour can be realized by way of a continuous recess or projection, it is advantageous to provide the closing contour as a combination of a recess with a hook shape that is aligned in longitudinal direction of the metal element. Depending on the design, the closing contour may also be formed by a closing element to be connected with the metal element.

The metal element is then shaped to assume an undulating configuration with at least one wave portion. Preparation of the end portions may hereby be implemented before or after or simultaneously with the shaping process of the metal element. The waveform extends hereby in length direction of the metal element so that individual peaks and valleys are curved about the axis of the metal element which has a section modulus that is smaller in relation to the cross section (weak axis). The weak axis extends in the direction of the width of the metal element, with the width being sized to exceed a height of the metal element.

In general, the cross sectional geometry is a function of the requirement at hand. Depending on the required geometry, the radially measured thickness of the limiter ring to be realized may also lie across its width so that the individual peaks and valleys are curved about the respective strong axis of the metal element. In the event of a symmetric, e.g. square, cross section, the waveform is restricted to a plane, with the metal element having at least one wave section. Advantageously, the undulating configuration resembles a stretched W shape with bent lengths and rounded transitions.

The undulating metal element is then placed in a suitable tool. The tool is provided to receive the metal element which has at least some sections which are contacted by parts of the tool from one side. The tool may have a continuous opening which splits the tool and has the shape of a slot. The opening may also be sized to split only a portion of the tool, with the slot extending from one marginal side of the tool to open the tool. Basically, the provision of a slight depression from one marginal side may also be conceivable. The metal element is placed in a suitable receptacle of the tool, with the metal element extending towards the opening in a transverse direction.

The method provides for the application of a stabilizer bar which may already be provided with its end contour. Also the end portions of the stabilizer bar may be respectively formed already. The ends of the stabilizer bar may thus be provided with suitable coupling zones for further vehicle components and/or bearings. The stabilizer bar may be coated or uncoated depending on the design.

After depositing the metal element and preparing the stabilizer bar, the stabilizer bar is placed in the tool. Advantageously, the elongated configuration of the stabilizer bar is placed in the opening of the tool, with the portion of the stabilizer bar being placed upon the metal element which later is used for securement with a bearing unit upon the vehicle structure. The stabilizer bar is placed upon the metal element in a transverse direction to the metal element. The stabilizer bar is hereby pressed in the tool against a circumference of the wave portion of the metal element. During the pressing process, the stabilizer bar is urged in its transverse direction upon the metal element so that the metal element is bent at least in part by a respective counter support in the tool about the tool.

As a result, the metal element has at least some regions formed in the stabilizer so that the pressed wave portion has at least one section which is ironed and the ironed section is urged into forced contact with the stabilizer bar. To realize the required ironing, a gap is provided between the tool and the deposited stabilizer bar and has a thickness which is smaller that a thickness of the metal element as measured in radial direction. Ironing is provided in individual sections of the metal element which are positioned within the tool. Ironing involves a plastic deformation of the metal element at least in some sections thereof.

The metal element is then bent entirely about the stabilizer bar. Bending of the metal element may take place during movement of the stabilizer bar by continuing to guide the stabilizer bar through the tool. The tool may basically also be provided with a suitable bending unit by which the metal element is bent around the stationary stabilizer bar in the tool. Also conceivable is a rolling of the stabilizer bar about the circumference of the metal element, in which case the metal element is bent about the stabilizer bar.

Thereafter, the end portions of the metal element are connected by engaging the closing contours of the end portions to thereby form a closed limiter ring. Advantageously, both closing contours interlock with one another. The closing contours engage hereby at a defined incline.

The displacement forces to be absorbed by the limiter ring are transmitted in particular by its ironed regions onto the stabilizer bar. The ironed and thus plastically deformed section of the limiter ring is in broad circumferential contact with the surface of the stabilizer bar. As a result of the design of the closing contours, the interconnected end portions exhibit a defined incline, when the closing contours interlock. The normal force inherent in the limiter ring is advantageously shifted away from the plane of the circumferential centroid axis of the metal element by providing the closing contours with a defined slant of the regions in engagement.

The closing contours can have an interlocking configuration in which the regions that are braced to one another through forced engagement are situated outside the centroid axis so as to establish an eccentric absorption of the normal force. The thus generated transverse force points hereby in the direction of the length axis of the stabilizer bar so that the end portions are pressed, at least in some sections, against the outer surface area of the stabilizer bar.

The defined incline results in an angle between a tangent, lying in the contact zone of the end portion and the stabilizer bar, and the end portion positioned at an incline in relation to the tangent. As a result of the incline, the end portions are pressed about their circumference upon the stabilizer bar to act as counter support for the ironed load-bearing regions of the closed limiter ring. The springback of the end portions as a result of the elasticity within the closed limiter ring contributes substantially to the longevity of the connection.

A method according to the present invention provides a cost-effective solution to make a stabilizer. The limiter ring to be secured to the stabilizer bar can be provided in an efficient manner and without any interference to subsequent method steps. In this way, the stabilizer can be worked on essentially without constraints, with the limiter ring being provided on the stabilizer only after executing finishing operations and, if need be, required peening.

According to another advantageous feature of the present invention, a portion of the metal element between the wave portion and the end portions can be formed around the stabilizer bar before connecting the end portions about the stabilizer body. In view of the undulating configuration of the metal element, only some sections of the metal element bear upon the circumference of the stabilizer bar when the metal element is shaped about the stabilizer bar. In particular, those sections of the metal element that represent peaks are distanced at least in part from the circumference of the stabilizer bar.

An circumferential length of the metal element bent in a way manner is shorter than a straight profile. Thus, the approaching closing contours of the end portions do not bear upon one another in a complementing manner during the shaping process. By forming the remaining regions of the metal element, the metal element is further ironed by leveling individual waves so that the metal element rests closely upon the stabilizer bar and the closing contours interlock in a better way. As a result of the additional ironing of the metal elements in length direction thereof, the metal element constricts further, thereby increasing the radial contact pressure upon the outer surface area of the stabilizer bar.

According to another advantageous feature of the present invention, the end portions may be end-formed in a region of the closing contours after closing the limiter ring. In this way, in the event the closing contours interlock only partly, the closing contours are brought into their intended final position and connected to one another in a force-locking and/or form-fitting manner. A variation that involves a stamped region of the end portions is ultimately connected to one another. In this case, the presence of a projection in the form of a hammer head would be conceivable which is pushed into the corresponding recess of the opposite end portion. End-forming of the closing contours causes these components to be firmly anchored with one another. The springback of the end portions required for a durable connection is generally maintained.

According to another advantageous feature of the present invention, the closing contours can be secured against loosening of their forced engagement. In this way, inadvertent opening of the connection and thus of the limiter ring is prevented. The securement may be realized through a formfit or by embossing or clinching for example. For example, the connection may be secured long-term by welding. Depending on the configuration and requirement, gluing may also be conceivable. This may be implemented for example during preparation of the end portions so as to realize the securement of the connection during closing of the limiter ring or during end-forming of the end portions. The selected securement may be configured in such a way as to maintain within the connection the springback required for a durable connection. This applies in particular when gluing is involved. In the event of a formfitting connection for example, the otherwise required springback may be omitted because the type of connection requires its destruction for opening.

According to another aspect of the present invention, a stabilizer includes a stabilizer bar, and a limiter ring for axial positional fixation of the stabilizer in a bearing unit connected to a motor vehicle, with the limiter ring being produced from a strip-shaped metal element and arranged in surrounding relationship to the stabilizer bar, wherein the metal element has end portions provided with complementary recesses for interlocking engagement with each other.

The recesses of the end portions may advantageously have hooks pointing in length direction of the metal element and interlocking in the closed state of the limiter ring.

In view of the separate configuration of the limiter ring as strip-shaped metal element, the limiter ring may also be arranged in regions of the stabilizer which as a result of cross sectional changes and expansions do not permit a threading of an initially closed limiter ring. Bending of the end portions is easy to accomplish. Depending on the construction of the assembly tool, the limiter ring may closely bear to other components of the stabilizer because there is no need for complicated devices with respective dimensions. The interlocked end portions provide advantageously a continuation of the remaining geometry of the metal element in the absence of possibly interfering regions.

According to another advantageous feature of the present invention, the recesses may have a defined incline relative to one another in the interlocked state. The incline can be advantageously realized through configuration of the closing contours. Advantageously, the normal force inherent in the limiter ring in the form of a tensile force can be absorbed eccentrically within the closing contours. As a result of the eccentricity, both end portions of the limiter ring are pressed at an incline against the circumference of the stabilizer bar.

According to another advantageous feature of the present invention, a securement may be provided to firmly connect the recesses of the end portions with one another. An example of a securement includes a formfitting connection, such as welding. The securement may also be realized by a pin which is driven or screwed through the end portions. The securement may also involve a targeted heat introduction to establish a firm connection of the end portions with one another. The connection may also be realized by clinching or stamping or combination of the afore-stated geometries. It will be understood that other examples of securement are, of course, conceivable as well and the examples given is not exhaustive. The springback rendered possible by the incline of the end portions should be maintained in particular when types of connections are involved which permit a later modification of the incline. Springback is required to attain a long lasting connection also when movable types of connection are involved.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
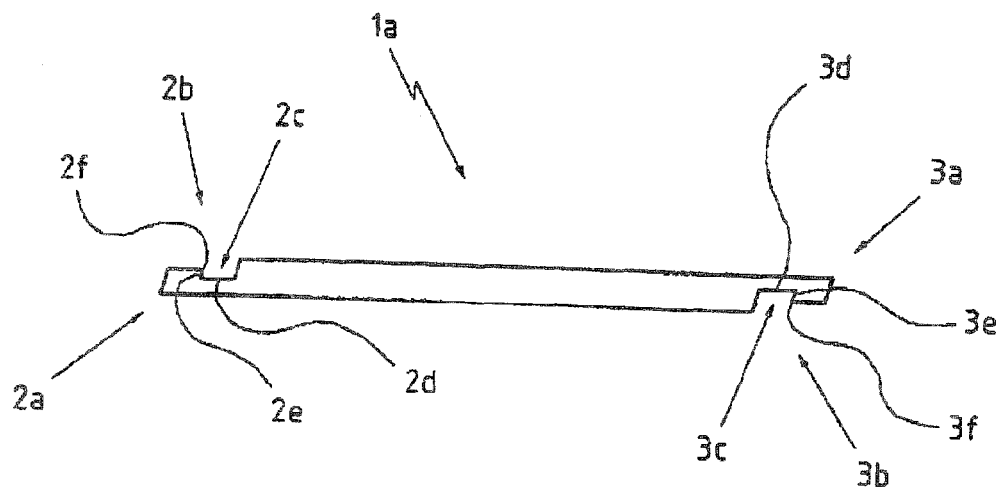
FIG. 1 is a side view of a strip-shaped metal element for axial securement of a stabilizer.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a side view of a strip-shaped metal element generally designated by reference numeral 1a for axial securement of a stabilizer. The metal element 1a has a straight profile between opposite end portions 2a, 3a. Each of the end portions 2a, 3a has a closing contour 2b, 3b, with the closing contour 2b of the end portion 2a having a recess 2c, and with the opposite closing contour 3b of the end portion 3a having a recess 3c. The closing contours 2b, 3b are formed in the end portions 2a, 3a as mirror images about the length axis of the metal element 1 so that the recesses 2c, 3c respectively point to the opposite side of the metal element 1a. The recesses 2c, 3c extend slantingly in the cross section of the metal element 1a. As a result, the recess 2c forms a hook 2f between a region 2d, lying more shallow in relation to the outer dimensions of the metal element 1a, and a sidewall 2e extending at a slant to the region 2d. Likewise, also the recess 3c forms a hook 3f between a region 3d, lying more shallow in relation to the outer dimensions of the metal element 1a, and a sidewall 3e extending at a slant to the region 3d.

Figure 2:
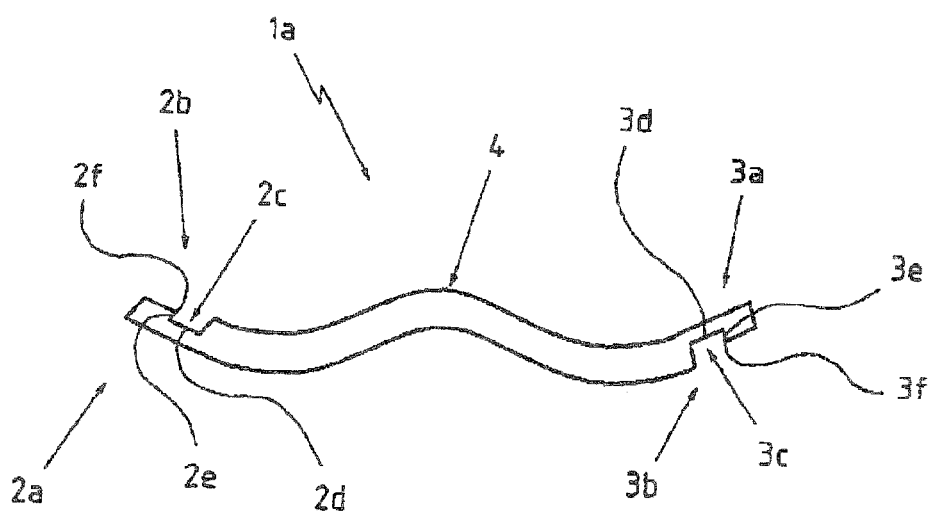
FIG. 2 is a side view of the metal strip of FIG. 1 after undergoing shaping into an undulating configuration.

The thus prepared metal element 1a is then shaped in a next step into an undulating configuration, as shown in FIG. 2. The metal element 1a assumes hereby a substantially shallow W-shape. A central elevation forms a wave portion 4 which is bent sinusoidal. The respective change in direction between the wave portion 4 and the end portions 2a, 3a of the metal element 1a have rounded transitions.

The next step involves preparation of a stabilizer bar 5.

Figure 3:
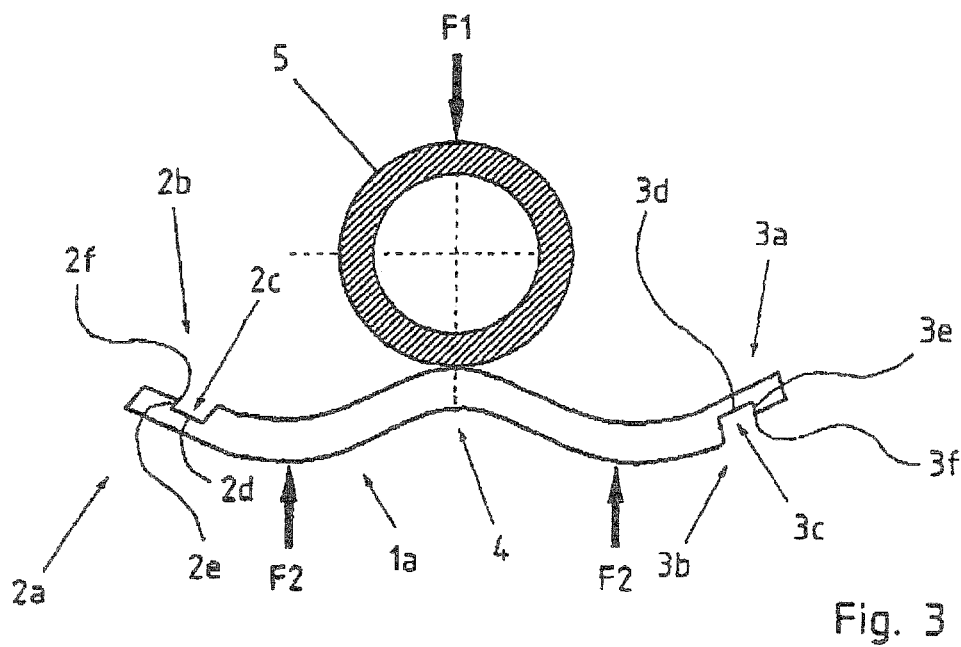
FIG. 3 is a side view of the metal strip of FIG. 2 in combination with a stabilizer bar.

FIG. 3 shows the undulating metal element 1a in combination with the stabilizer bar 5. The stabilizer bar 5 is placed in midsection onto the wave portion 4 of the metal element 1a. The stabilizer bar 5 is formed from a tube. The alignment of the stabilizer bar 5 extends transversely to the length direction of the metal element 1a. A force F1 urges the stabilizer bar 5 against the wave portion 4 so that the metal element 1a exerts a counterforce F2 which is applied in the regions of the metal element 1a between the wave portion 4 and the end portions 2a, 3a. The counterforce F2 is defined by a position within a tool 6 which is not shown in FIG. 3 and shown in FIG. 4.

Figure 4:
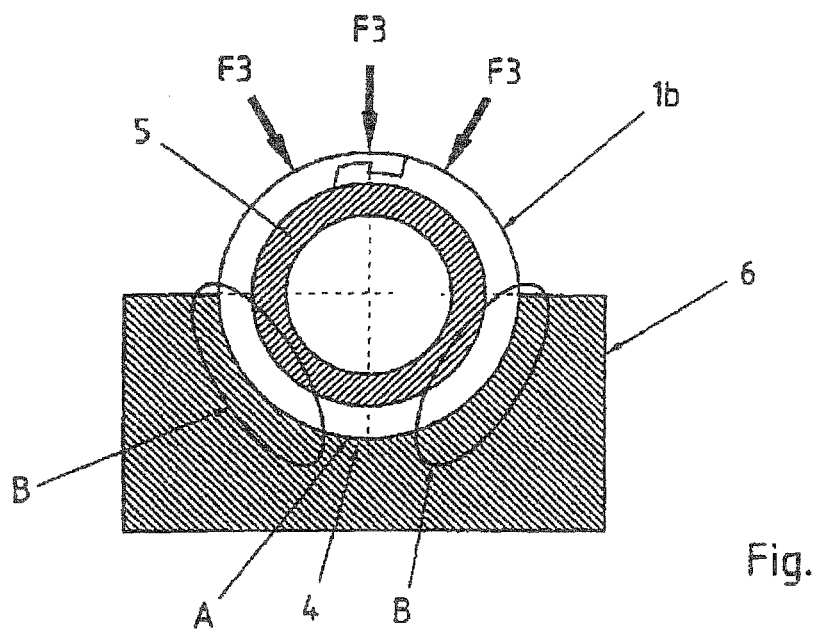
FIG. 4 is a sectional view of a tool with the combination of metal strip and stabilizer bar according to FIG. 3 being received in the tool.

The metal element 1a is placed together with the stabilizer bar 5 into the tool 6 shown in FIG. 4. The tool 6 has a semicircular opening A. The stabilizer bar 5 is hereby positioned with one half of its cross section within the tool 6. The metal element 1a is formed around the stabilizer bar 5, with the complementing closing contours 2b, 3b engaging one another. As a result, the metal element 1a forms a closed limiter ring 1b. The wave portion 4 pressed against the stabilizer bar 5 is ironed at least in some sections in two regions B of the limiter ring 1b in a contact zone with the tool 6 so that the ironed regions B are in contact with the stabilizer bar 5 through interference fit. The ironed regions B have thus been plastically deformed. The end portions 2a, 3a are end-formed in the area of the closing contours 2b, 3b by applying a force F3 to thereby establish a firm closure of the limiter ring 1b.

Figure 5:
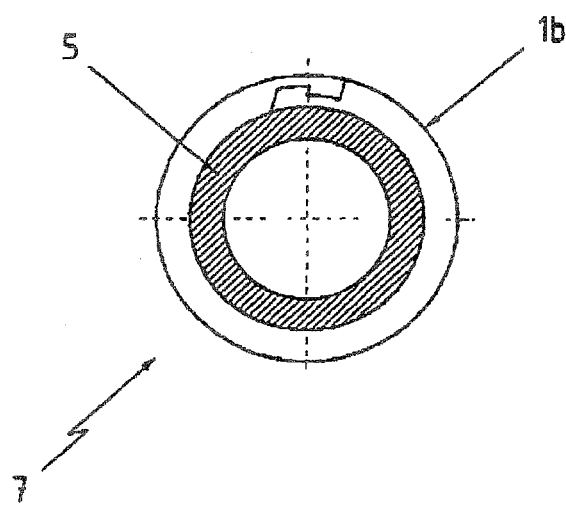
FIG. 5 is a sectional view of a stabilizer in accordance with the present invention as a result of a forming process in the tool.

FIG. 5 shows a finished stabilizer 7 after removal from the tool 6. The stabilizer 7 is comprised of the stabilizer bar 5 and the limiter ring 1b which is wrapped around the circumference of the stabilizer bar 5.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed is:

1. A method of producing a stabilizer for installation in a bearing unit of a motor vehicle; said method comprising:
   providing each end portion of a strip-shaped metal element with a closing contour;
   shaping the metal element to assume an undulating configuration with at least one wave portion;
   placing the undulating metal element in a tool;
   pressing a stabilizer bar in the tool against a circumference of the wave portion of the metal element;
   forming the wave portion onto the stabilizer bar such that the wave portion has at least one section which is ironed and the ironed section is urged into forced contact with the stabilizer bar;
   bending the metal element to embrace the stabilizer bar; and
   connecting the end portions of the metal element by engaging the closing contours of the end portions with a defined incline to thereby form a closed limiter ring fixed to the stabilizer bar.

2. The method of claim 1, wherein the metal element is cut to size from a sheet metal strip.

3. The method of claim 1, further comprising forming a portion of the metal element between the wave portion and the end portions around the stabilizer bar before the connecting step.

4. The method of claim 1, further comprising end-forming the end portions in a region of the closing contours.

5. The method of claim 1, further comprising securing the closing contours against loosening of their forced engagement.

6. A stabilizer, comprising:
   a stabilizer bar; and
   a limiter ring for axial positional fixation of the stabilizer in a bearing unit of a motor vehicle, said limiter ring being formed from a strip-shaped metal element and arranged in surrounding relationship to the stabilizer bar, said metal element having end portions provided with complementary recesses for interlocking engagement with each other.

7. The stabilizer of claim 6, wherein the recesses have a defined incline relative to one another, when the recesses are interlocked with one another.

8. The stabilizer of claim 6, further comprising a securement to firmly connect the recesses with one another.

* * * * *